US009502854B1

(12) United States Patent
Filgas (10) Patent No.: US 9,502,854 B1
(45) Date of Patent: Nov. 22, 2016

(54) SELF-SEEDING HIGH POWER LASER (71) Applicant: RAYTHEON COMPANY, Waltham, MA (US)

(72) Inventor: David M. Filgas, Newbury Park, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/836,769

(22) Filed: Aug. 26, 2015

(51) Int. Cl.
   *H01S 3/136* (2006.01)
   *H01S 3/13* (2006.01)
   *H01S 3/10* (2006.01)
   *H01S 3/105* (2006.01)

(52) U.S. Cl.
   CPC ......... *H01S 3/1305* (2013.01); *H01S 3/10015* (2013.01); *H01S 3/10023* (2013.01); *H01S 3/1003* (2013.01); *H01S 3/10053* (2013.01); *H01S 3/1053* (2013.01); *H01S 3/10084* (2013.01); *H01S 3/10092* (2013.01); *H01S 3/1307* (2013.01)

(58) Field of Classification Search
   CPC .......... H01S 3/10015; H01S 3/10023; H01S 3/1003; H01S 3/10053; H01S 3/10084; H01S 3/10092; H01S 3/1053; H01S 3/1305; H01S 3/1307
   See application file for complete search history.

(56) References Cited

U.S. PATENT DOCUMENTS

| 4,249,140 A | * | 2/1981 | Frieberg | G02B 26/06 372/103 |
| 5,305,334 A | * | 4/1994 | Margalit | H01S 3/10092 372/10 |
| 6,782,016 B2 | * | 8/2004 | Braiman | H01S 5/4006 372/10 |
| 6,809,307 B2 | | 10/2004 | Byren et al. | |
| 7,339,727 B1 | * | 3/2008 | Rothenberg | H01S 3/06791 359/349 |
| 8,514,485 B2 | * | 8/2013 | Rothenberg | G02B 6/02042 359/341.1 |
| 8,731,013 B2 | * | 5/2014 | Byren | F41H 13/005 372/26 |
| 8,811,437 B2 | * | 8/2014 | Eicchorn | H01S 3/1307 372/29.023 |
| 2003/0198265 A1 | * | 10/2003 | Vetrovec | H01S 3/042 372/35 |

OTHER PUBLICATIONS

Spall, James C.; "An Overview of the Simultaneous Perturbation Method for Efficient Optimization"; 1998; John Hopkins APL Technical Digest; vol. 19; No. 4; pp. 482-492.

* cited by examiner

Primary Examiner — Tod T Van Roy
(74) Attorney, Agent, or Firm — Lewis Roca Rothgerber Christie LLP (57) ABSTRACT

A self-seeding high power laser includes a spatial filter; an optical relay for circulating a low power un-distorted optical beam, an adaptive optic optically coupled to the output of the optical relay; a high power amplifier optically coupled to an output of the adaptive optic phase control element, wherein adaptively modified phasefront injected by the adaptive optic cancels distortions produced by the high power amplifier; a beamsplitter optically coupled to the high power amplifier for splitting the high power un-distorted optical beam into a high power output beam as the output of the self-seeding high power laser, and a low power beam; a focusing lens; a detector for detecting a metric of the low power beam; and a controller for adaptively controlling the adaptive optic to maximize the power of the high power amplifier, based on the detected metric.

15 Claims, 6 Drawing Sheets

SELF-SEEDING HIGH POWER LASER

FIELD OF THE INVENTION

The present invention relates generally to high power lasers; and more particularly to a self-seeding high power laser.

BACKGROUND

High-power fiber lasers and particularly amplifiers with output powers of tens or hundreds of watts, sometimes even several kilowatts are becoming more in demand. Lasers with high output powers are required for a number of applications, e.g. for material processing (welding, cutting, drilling, soldering, marking, surface modification); large-scale laser displays; remote sensing (e.g. with a LIDAR); medical applications (e.g. surgery); military applications (e.g. anti-missile weapons); and fundamental science (e.g. particle acceleration), among others.

A typical high-power laser requires one or several powerful pump sources. Pumping with high-power laser diodes has become more widespread. High power lasers are often configured as a Master Oscillator/Power Amplifier (MOPA), where a low power, high beam quality master oscillator is amplified to high output power in one or more power amplifiers. A high power adaptive optics (AO) is typically placed after the power amplifier and used to correct any phase distortions imparted on the beam during amplification. However, at multi-kilowatt power levels, creating a suitably powerful master oscillator and an adaptive optics with suitable power handling is problematic.

Injection seeders are devices that direct the output of small seed lasers into the cavity of a much larger laser to stabilize the larger laser's output. Most seed lasers are stable, single-frequency lasers that emit within the linewidth of the larger laser's gain medium. The single frequency of the seed laser encourages the larger laser to emit in a single longitudinal mode. Seed lasers can be continuous or pulsed. Seeding a pulsed laser can reduce variations in the output energy and timing (jitter) from pulse to pulse, and smooth out temporal variations within the pulse. Many commercial lasers use a laser diode as a seeding source. However, an extra laser for a seeding source, adds to the cost and complexity of the laser device.

High power laser systems are being considered for variety of industrial applications, e.g., cutting, drilling, welding, and heat treating, and military directed energy weapon applications with respect to a variety of platforms, e.g., spaceborne, airborne and land based systems to name a few. To achieve application objectives, high power laser systems must be accurately steered and optimally focused. Steering involves line-of-sight control and focusing, with respect to HEL systems, involves wavefront error correction. Currently, wavefront error correction is typically achieved using adaptive optics. In addition, one or more fast steering mirrors may be used to correct for tilt and direct the line-of-sight. A plurality of wavefront sensors are typically employed along with an aperture sharing element (ASE).

However, scaling solid state HELs is a complicated task and typically results in degradation of the output beam due to waste heat deposited in the lasing medium and the attendant thermal lensing and birefringence. That is, the higher the power of the laser, the higher the distortion of the laser output beam. Existing solutions for multi-kilowatt, near diffraction limited, solid-state lasers generally fall into one of three categories: 1) Power oscillators with intra-cavity high power adaptive optics; 2) single beamline MOPA systems with one or more amplifiers in series; and 3) beam-combined systems with multiple parallel smaller power oscillators or MOPA's. The first category, shown in FIG. 1, is normally used with low gain laser materials.

Figure 1:
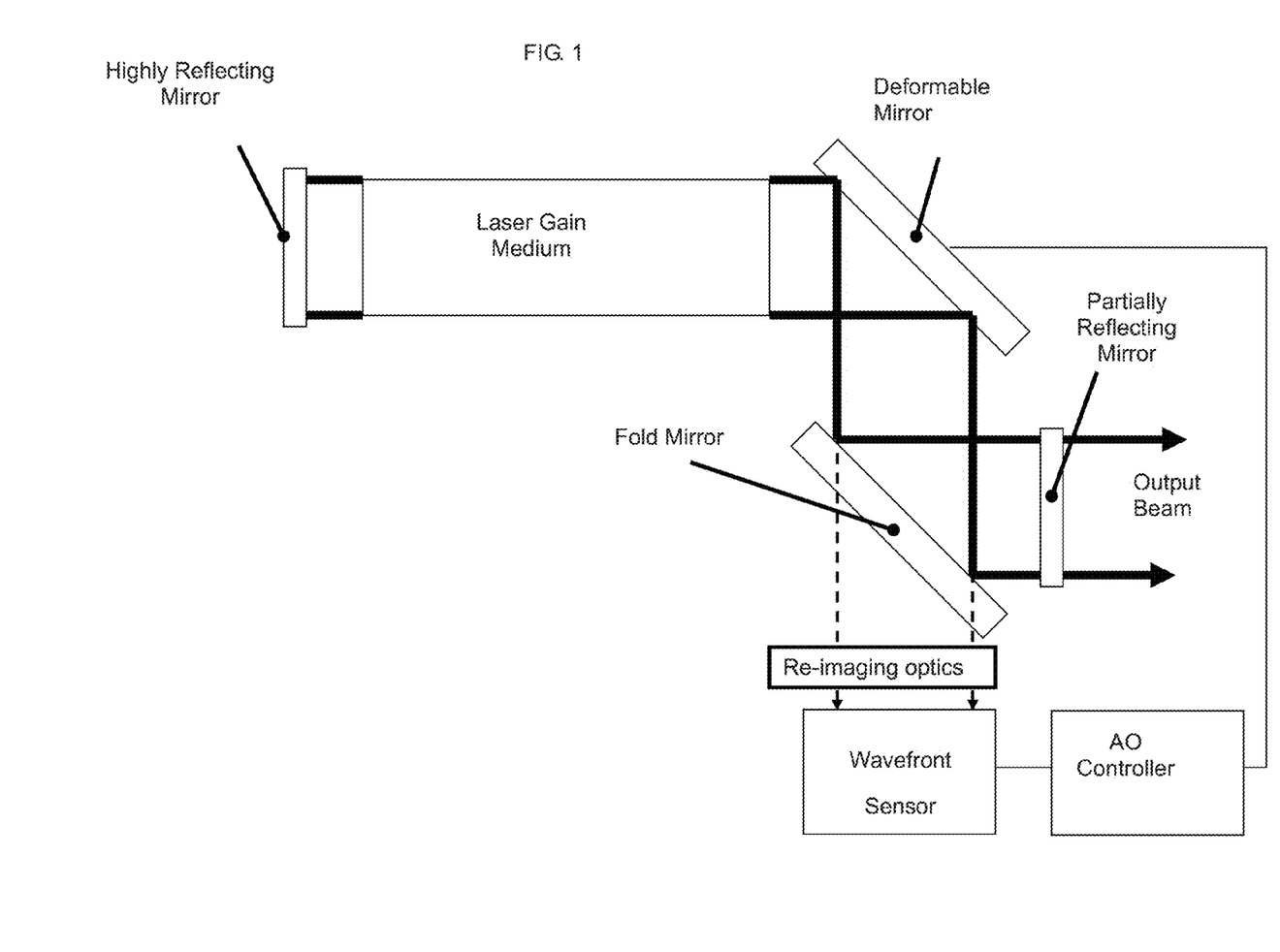
FIG. 1 is a simplified block diagram of a power oscillator high gain amplifier, according to prior art.

FIG. 1 is a simplified block diagram of a power oscillator high gain amplifier, according to prior art. For a typical solid state laser, the laser gain medium is optically pumped with laser diodes and achieves a population inversion with a single-pass gain that exceeds unity. Laser signal originates from optical noise in the cavity and is amplified via stimulated emission as it oscillates between the highly reflecting mirror and the partially reflecting mirror due to constructive feedback. The deformable mirror located within the laser cavity adjusts the wavefront (or phasefront) of the oscillating laser beam such that the phase is flat at the wavefront sensor's aperture. Re-imaging optics (not shown) are typically inserted in the path of the sample beam that is transmitted through the fold mirror (or beamsplitter) which reimage the entrance aperture of the wavefront sensor to the aperture of the deformable mirror, thereby ensuring accurate correction. An adaptive optics (AO) controller receives the electrical signal from the wavefront sensor and generates actuator commands that drive the deformable mirror to a shape that is the conjugate (or reverse) of the sensed wavefront. The result is a higher quality output beam with minimal residual wavefront distortion. One limitation of this power oscillator (PO) architecture is that the intra-cavity intensity is larger than the output beam intensity by the inverse of the partially-reflecting mirror reflectivity which for low-gain media can be very high. This subjects the laser gain medium to high thermal stress and exacerbates the beam degradation due to thermal lensing and birefringence. It also subjects the deformable mirror element to the same high intra-cavity intensity, which may exceed the power handling limitations of these devices for some applications.

Figure 2:
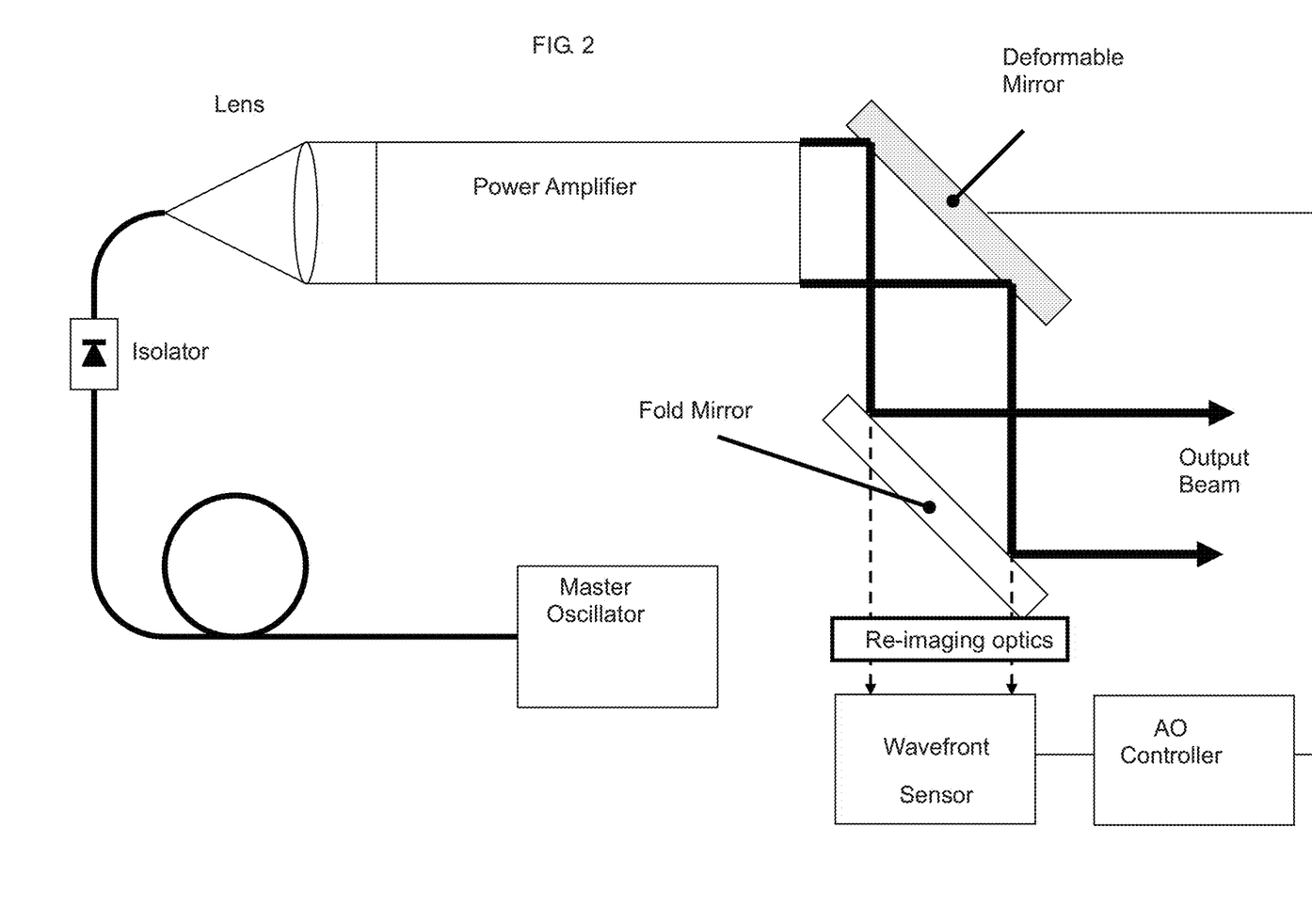
FIG. 2 is a simplified block diagram of a MOPA HEL with high power adaptive optics, according to prior art.

The second category, shown in FIG. 2, requires a relatively high power Master Oscillator (MO) (with powers typically ranging from 1% to 10% of the system output power) in order to keep the amplifier gain reasonably low for efficient operation and to minimize the deleterious effects of optical feedback into the MO. These lasers are also typically implemented with high power adaptive optics at the output but could potentially use an adaptive optics located between the MO and the power amplifier (PA), where the power on the deformable mirror is lower.

The architecture of the MOPA in FIG. 2 differs from that of the power oscillator of FIG. 1, because there are no mirrors defining a laser cavity surrounding the high power gain medium (Power Amplifier) and the signal originates from a separate external master oscillator that may be fiber coupled into the power amplifier with an isolator stage that minimizes feedback from the amplifier into the MO. A beam shaping lens is included at the output of the fiber to expand and shape the beam for efficient coupling into the power amplifier aperture.

A third category laser can reduce the power loading of the amplifier elements and the power incident on the adaptive optics by 1/N where N is the number of parallel beams combined, however, the complexity level of such systems leads to high cost, reduced reliability, and large size/weight. A sensor at the output (not shown) measures the phase (piston error) between the output beams which drives the average phase of each DM.

SUMMARY

The embodiment of the present invention includes a ring geometry and an adaptive optics in the laser cavity. In the direction of propagation around the loop, the adaptive optics can be located between the output coupler and the amplifier in the lower power portion of the beam path or between the amplifier and the output coupler in the high power beam path. Using the present invention, the need for an external master oscillator (as required in a MOPA configuration) is eliminated, resulting in a less complex, lower cost and more robust high power laser. Compared to the very high intra-cavity intensity of a large power oscillator which requires the intra-cavity adaptive optics to operate at very high power levels, the present invention allows the intra-cavity adaptive optics to operate at a reduced power load, in particular, if the adaptive optics is located in the low power portion of the loop. The present invention also avoids the complexity of measuring and adjusting the phase of coherently combined array of parallel amplifier beamlines as required in phase combined HEL architectures.

In some embodiments, the present invention is a self-seeding high power laser that includes a spatial filter; an optical relay for circulating a low power un-distorted optical beam from the spatial filter, an adaptive optic optically coupled to the output of the optical relay for adaptively modifying a phasefront of the low power un-distorted optical beam; a high power amplifier optically coupled to an output of the adaptive optic phase control element for generating a high power un-distorted optical beam, wherein the adaptively modified phasefront injected by the adaptive optic cancels distortions produced by the high power amplifier to generate said high power un-distorted optical beam; a beamsplitter optically coupled to the high power amplifier for splitting the high power un-distorted optical beam into a high power output beam as the output of the self-seeding high power laser, and a low power beam; a focusing lens for focusing the low power beam into the spatial filter; a detector for detecting a metric of the low power beam filtered by the spatial filter; and a controller for inputting the detected metric and, based on the detected metric, adaptively controlling the adaptive optic to maximize the power of the high power amplifier.

In some embodiments, the present invention is a self-seeding high power laser that includes a spatial filter; an optical relay for circulating a low power un-distorted optical beam; a high power amplifier optically coupled to the output of the optical relay for generating a high power optical beam with distortions; an adaptive optic phase control element optically coupled to the output of the high power amplifier for adaptively modifying a phasefront of the high power optical beam with distortions to generate a high power un-distorted optical beam, wherein the adaptively modified phasefront injected by the adaptive optic cancels distortions produced by the high power amplifier to generate said high power un-distorted optical beam; a beamsplitter optically coupled to the adaptive optic phase control element for splitting the high power un-distorted optical beam into a high power output beam as the output of the self-seeding high power laser, and said low power beam to be circulated by the optical relay; a detector for detecting a metric of the wavefront sample beam; and a controller for inputting the detected metric and, based on the detected metric, adaptively controlling the adaptive optic phase control element to minimize the phase wavefront distortion of the high power output beam.

In some embodiments, the self-seeding high power laser may include a beam shaping or beam formatting optics for coupling the low power un-distorted optical beam into the adaptive optic. In some embodiments, the self-seeding high power laser may include an isolator in the beam path for preventing any reverse propagation.

In some embodiments, the detector may be a power detector and the metric may be a power of the low power beam. In some embodiments, the detector may a wavefront sensor detector and the metric may be wavefront of the low power beam.

BRIEF DESCRIPTION OF THE DRAWINGS

These and other features, aspects, and advantages of the present invention will become better understood with regard to the following description, appended claims, and accompanying drawings.

DETAILED DESCRIPTION

In some embodiments, the present invention achieves a single beamline high power solid-state laser with near diffraction limited beam quality that does not need a master oscillator and does not use high power adaptive optics. This is achieved by using a single high gain (e.g., a gain of about 100), high power amplifier in a ring oscillator configuration with a very high output coupling ratio (e.g., about 99%). This "self-seeding" configuration still requires an adaptive optics to achieve near diffraction-limited beam quality, however, the adaptive optics is located in a low power leg of the ring where the power on the adaptive optics is a small fraction (for example, around 1%) of the system output power. Since, adaptive optics capable of handling this power level are higher maturity, lower cost, and more robust that adaptive optics capable of handling the full output beam power, this reduces cost, size, and complexity, and improves system robustness.

Figure 4:
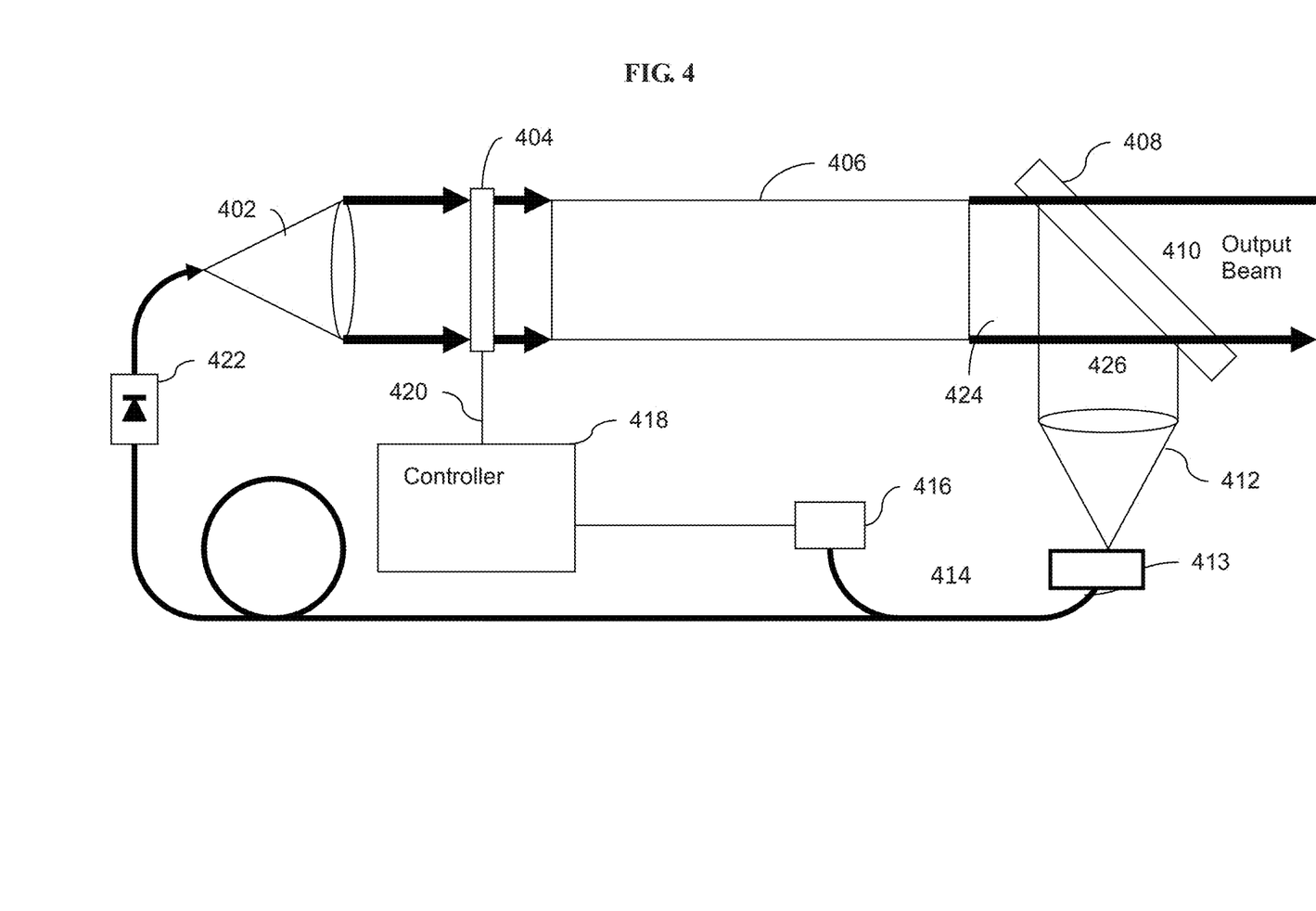
FIG. 4 depicts an exemplary simplified block diagram for a self-seeding high-energy laser (HEL), according to some embodiments of the present invention.

FIG. 4 depicts an exemplary simplified block diagram for a self-seeding HEL, according to some embodiments of the present invention. The signal beam in the self-seeding HEL builds up from spontaneous emission, which is then amplified, filtered and recirculated to produce a high power laser beam at the output. As shown, the circulating beam enters a beam shaping or beam formatting optics 402, for example, a lens, and is incident on an adaptive optics (AO) phase control element 404 before it enters the high power amplifier 406. Depending on the type of relay and the type of amplifier, the beam shaping or beam formatting optics may be a series of lenses, or may be an afocal telescope which simply resizes the beam.

The AO phase control element may be a deformable mirror, optical phased array (OPA) or other form of spatial light modulator that modifies the phase profile of incident optical radiation. The high power amplifier 406, which may be a planar wave guide (PWG) with gain in excess of 100, amplifies the output from the AO phase control element 404, however, it also produces some phase distortion at its output due to thermal effects within the gain medium and other aberrations in the high power region. The phase distortions may arise from temperature variations within gain medium due to thermo-optic (dn/dT), elasto-optic, and dimensional distortion effects. Other aberrations may arise from similar effects in intervening optical elements and thermally induced turbulence in the intervening air. The AO's phase control element, controlled by an AO controller 418, adaptively pre-distorts the phase of the diffraction-limited beam from an optical relay 414 at the input of the high power amplifier 406, so that the generated pre-distortion cancels the phase distortion (e.g., thermal lensing) within the amplifier at the output 424 of the amplifier. The optical relay 414 may be fiber, free-space optics or a combination thereof.

The high power beam output 424 of the amplifier 406 is split by a partially reflecting fold mirror (or beamsplitter) 408 to a high power output beam 410 and a low power recirculating beam 426. Depending on the gain of the high power amplifier 406 and the system requirements, the low power beam 426 is a small fraction (e.g., 1-10%) of the output 424 of the amplifier. The low power beam 426 is input to the optical relay 414 for circulating a low power un-distorted optical beam from a spatial filter 413 through a focusing lens 412 and fed back to the beam shaping or beam formatting optics via relay optics (single mode optical fiber shown in figure) and optical isolator 422. The optical isolator 422, for example, a faraday isolator, prevents any reverse propagation/reflection of the beam back into the spatial filter 413 from the power amplifier 406. In some embodiments, the optical isolator 422 may be placed in a free-space portion of the optical relay. The spatial filter 413 may be the polished end of a single mode fiber, a pinhole (as shown), a slit (as in the case of a high aspect ratio amplifier such as a planar waveguide) or any other type of single mode optical spatial filter. The low power beam 426 propagating through the spatial filter 413 is distortion free due to the characteristics of the spatial filter 413, that is, the spatial filter 413 passes only the fundamental mode of the low power beam 426. The beamsplitter 408 may for example be a partially reflecting mirror (as shown), thin pellicle mirror, holographic optical element, low efficiency diffraction grating, or a pair of low efficiency gratings in rhomboid configuration.

An optical detector 416 measures the power of the spatially-filtered low power beam and feeds the information to the AO controller 418. Using that information, the controller adaptively controls the AO phase control element 404 via a control signal 420, for example, by moving the plurality of mirror actuators in a deformable mirror phase control element to produce the desired pre-distortion in the input beam of the high power amplifier 406. This way, through the "feedback" loop, the AO phase control element 404 maximizes the beam quality and power at the output 424 of the high power amplifier 406, by eliminating or substantially reducing the distortion at the output of the amplifier.

In some embodiments, the controller 418 performs a classic "Hill Climbing" technique to adaptively and effectively maximize the beam quality and power at the output 424 of the high power amplifier 406, using the beam power transmitted through the spatial filter 413 as an optimization metric. As known to one skilled in the art, hill climbing is a mathematical optimization technique, which is an iterative algorithm that starts with an arbitrary solution to a problem. The technique then attempts to find a better solution by incrementally changing one or more input parameters (in this case the phase profile of the beam input to the power amplifier). If the change produces a better solution, an incremental change is made to the optimization parameter(s), repeating until no further improvements can be found. If the change produces a worse solution, no change is made to the optimization parameter(s) and the technique re-starts with the previous solution. Hill climbing typically works best for finding a local optimum, but is not guaranteed to find the best possible solution (i.e., a global optimum) out of all possible solutions.

In some embodiments, the controller 418 performs a stochastic parallel gradient descent (SPGD) control technique, which is one example of the hill climbing technique. In a SPGD control technique, gradient estimation is applied in parallel via stochastic perturbation of the (mirror) actuators in the deformable mirror. The technique performs a "Coin-flip" statistics for perturbation generation about a reference state and measures sensor metrics (for example, power of the spatially filtered beam) in a perturbed state. A more detail description of a SPGD control technique is described in James C. Spall, "An Overview of the Simultaneous Perturbation Method for Efficient Optimization," Johns Hopkins APL Technical Digest, Vol. 19, No. 4 (1996), the entire contents of which is hereby expressly incorporated by reference.

Figure 5:
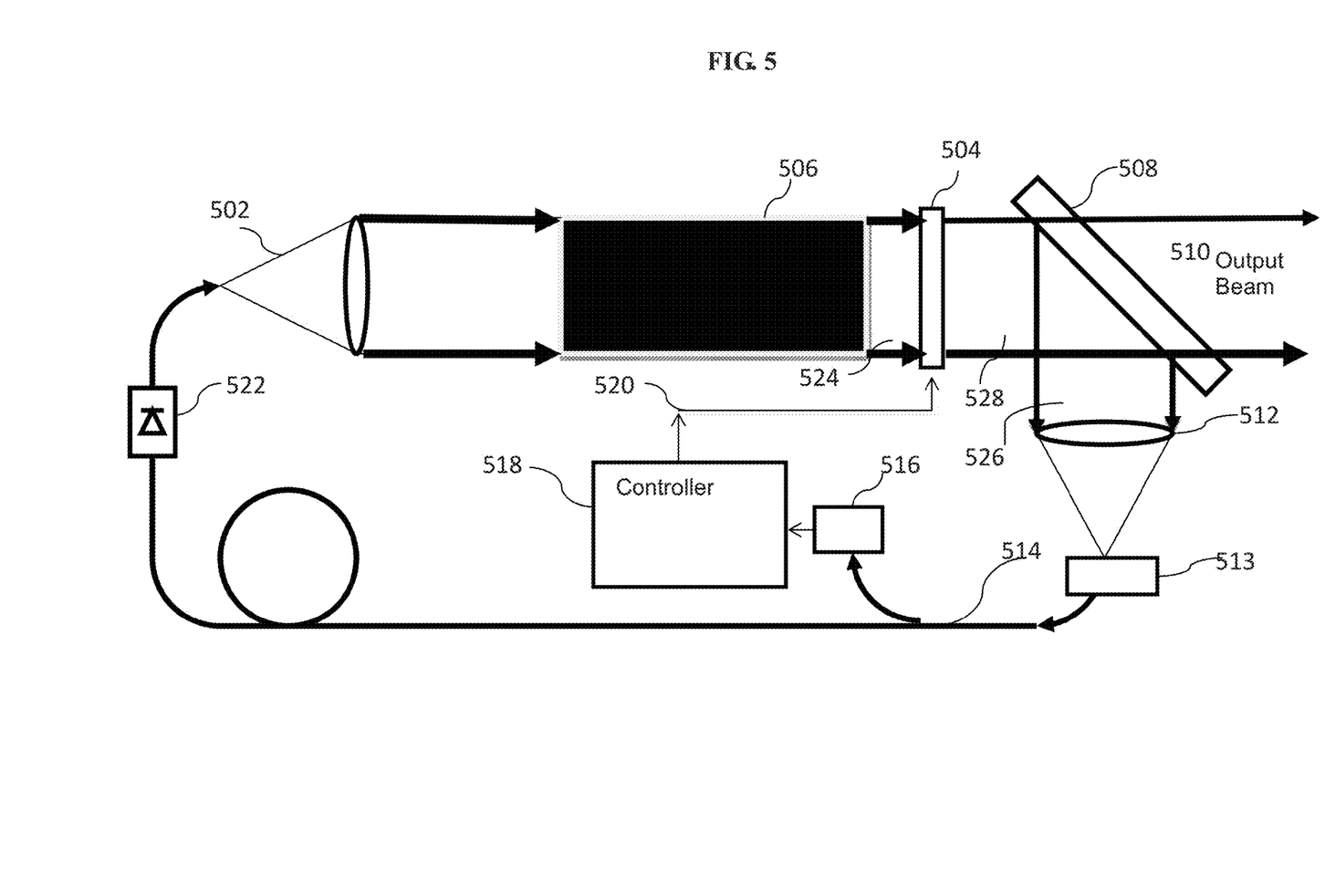
FIG. 5 shows an exemplary simplified block diagram for a self-seeding high-energy laser (HEL), according to some embodiments of the present invention.
Figure 6:
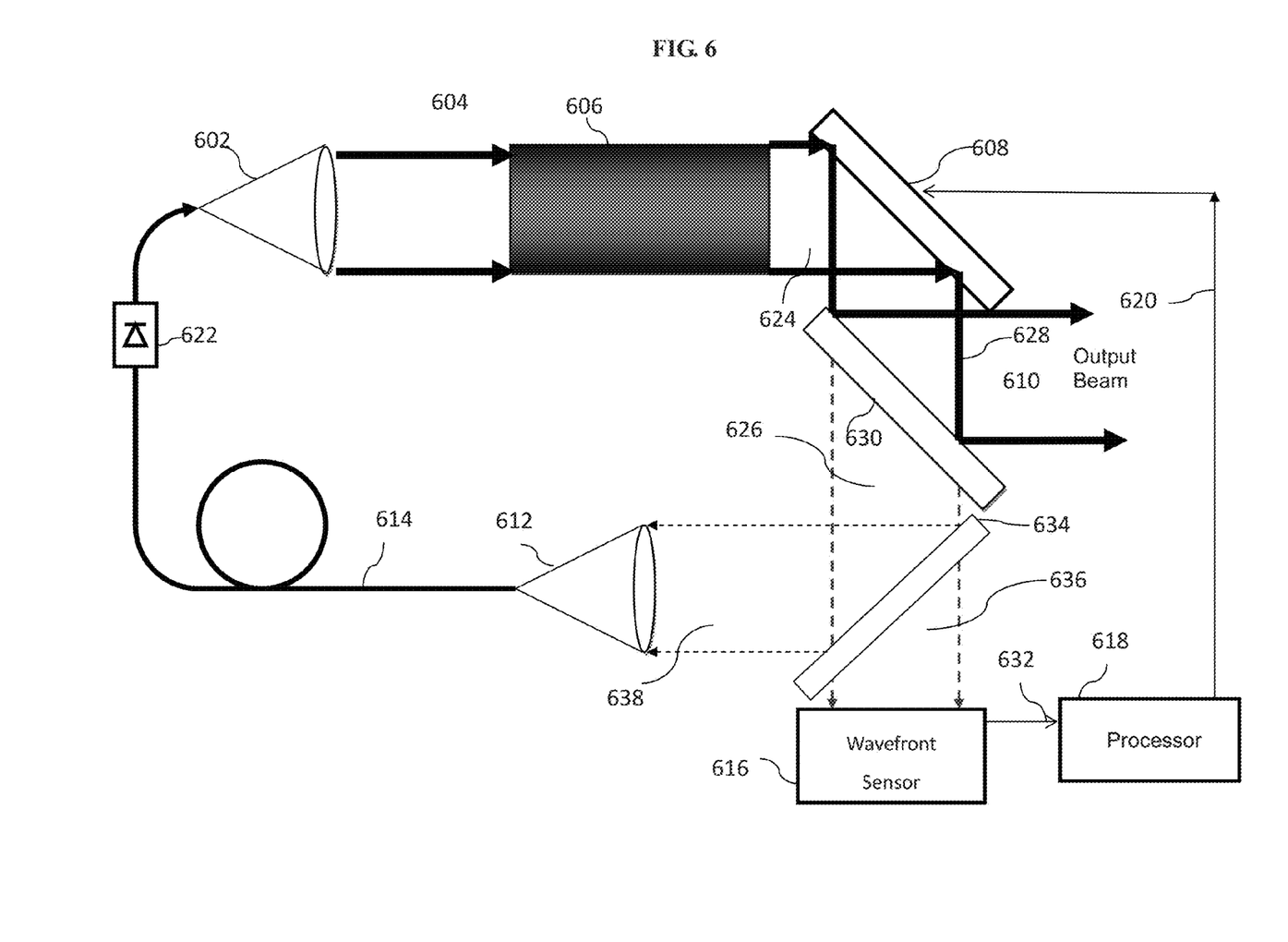
FIG. 6 depicts an exemplary simplified block diagram for a self-seeding high-energy laser (HEL) with wavefront sensing, according to some embodiments of the present invention.

As shown in FIG. 4, the adaptive optics phase control element 404 is located in the low power recirculating beam path, disposed between the beam shaping or beam formatting optics 402 and the high power amplifier 406. However, as shown in FIGS. 5 and 6, the AO phase control element may be placed at the output stage of the high power amplifier. In either case, the AO phase control element is controlled (by the controller) to achieve highest output beam quality (near diffraction limited) with highest output power resulting in a focusable beam that can put maximum laser intensity on a remote target.

In some embodiments, if a single-mode fiber is used as the spatial filter to spatially filter the beam, that fiber may optionally be an active fiber (for example, doped with laser ions) to have a gain (for example, more than 10) to amplify the low power beam and therefore the low power beam may be a smaller fraction of the output 424 of the amplifier. That is, an even higher output coupling fraction such as 99.99% (for example, with a gain of 100 in the power amplifier and Gain of 100 in the active fiber).

FIG. 5 depicts an exemplary simplified block diagram for a self-seeding high-energy laser (HEL), according to some embodiments of the present invention. The main difference between these embodiments and those depicted in FIG. 4 is that in these embodiments, the adaptive optic 504 is located at the output of the power amplifier 506, between the amplifier and the beamsplitter 508. This way the AO phase control element 504 is adaptively controlled by the controller 518 to cancel the distortion produced by the power amplifier 506 in the high power beam 524 and to produce a low distortion high power beam 528 to be split to a high power output beam 510 and a low power (feedback) beam 526, by the beamsplitter 508.

The low power beam 526 is input to an optical relay 514 through a spatial filter 513 by a focusing lens 512, and fed back to a beam shaping or beam formatting optics 502 via the optical relay 514 through an optical isolator 522. The optical relay 514 circulates the low power un-distorted optical beam from a seed beam leg of the beamsplitter 508. An optical detector 516 measures the spatially filtered low power beam and feeds the information to the controller 518. Using that information, the controller adaptively controls the AO phase control element 504 via a control signal 520 to minimize the aberrations at the output beam 510. The advantage of the self-seeding laser architecture in FIG. 4 is that no high power adaptive optics elements are used making this architecture more amenable to very high power applications.

FIG. 6 depicts an exemplary simplified block diagram for a self-seeding high-energy laser (HEL) with wavefront sensing, according to some embodiments of the present invention. In these embodiments, instead of sensing or sampling the power of the beam at the output of the amplifier 624 through a spatial filter 614 (like the optical detector 416 and 516 in FIGS. 4 and 5, respectively), a wavefront sensor 616 measures the wavefront at the output of the amplifier 624. Similar to the embodiments of FIG. 4, an input beam is expanded and formatted with a beam shaping or beam formatting optics 602 and is directed into the high power amplifier 606. The high power amplifier 606, amplifies the beam, however, it also introduces some phase distortion at its output due for example to thermal effects. The AO's 608 phase control element, controlled by a controller 618, adaptively modifies the phasefront at the output of the high power amplifier 606, so that the generated distortion cancels the phase distortion (thermal lensing) within the amplifier at the output 624 of the amplifier.

The high power beam output 624 of the amplifier 606 is reflected by the AO's phase control element (deformable mirror) 608 to generate a high power beam 628 with low phase distortion. The surface of a deformable lens/mirror can be deformed to achieve wavefront control and correction of optical aberrations. The high power low distortion beam 628 is then reflected from a fold mirror beamsplitter 630 to generate a high power output beam 610 and a low-power sample beam 626. The sample beam 626 is split further by a second beamsplitter 634 into a wavefront sample 636 and a seed beam 638. The wavefront of the wavefront sample YYY is measured by a wavefront sensor 616. The seed beam 638 is input through a focusing lens 612 to relay optics 614 (single mode optical fiber in figure) and fed back to the beam shaping or beam formatting optics 602 through an optical isolator 622.

The wavefront sensor 616 senses the wavefront of the wavefront sample 636 from the second beamsplitter 634 and feeds the information to the controller 618 via electrical interface 632. Using that information, the controller adaptively controls the AO's phase control element via a control signal 620, for example, by moving the plurality of mirror actuators in the deformable mirror to produce the desired correction distortion in the output beam 610. This way, through the "feedback" loop, the deformable mirror 608 minimizes the amount of distortions in the output beam 610.

In some embodiments, the controller 618 may use a classic (known) last frame phase conjugation algorithm to adaptively and effectively minimize the amount of distortions in the output beam 610, using the wavefront information in the wavefront sample 636.

Figure 3:
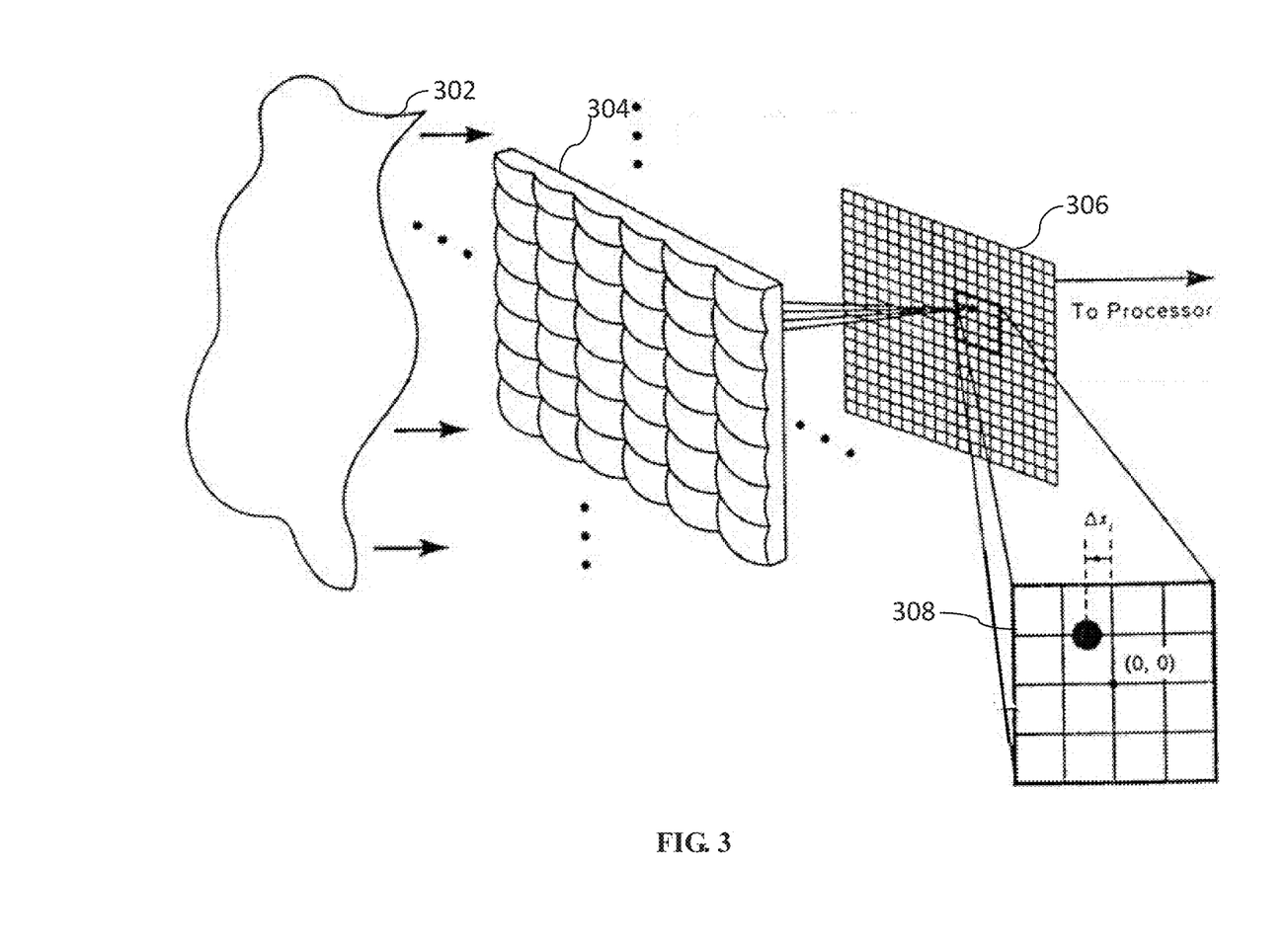
FIG. 3 illustrates a typical wavefront sensor.

A typical wavefront sensor, a Shack-Hartmann sensor is illustrated in FIG. 3. The sensor has been used historically to measures the phase-only aberrations caused by atmospheric turbulence or laser transmission. As shown, an array of lenses (lenslets) 304 of the same focal length capture an incoming wavefront 302. Each of the array of lenslets 304 is focused onto a photon sensor/detector (For example, a CCD array or quad-cell). The local tilt of the wavefront across each lens can then be calculated from the position of the focal spot 308 on the sensor. Any phase aberration can be approximated to a set of discrete tilts. By sampling an array of lenslets, all of these tilts can be measured and the entire wavefront can be approximated, by a processor.

The proposed configuration of a high power laser in a ring geometry with a very high output coupling fraction and adaptive optics located between the beam shaping or beam formatting optics and the high power amplifier, or between the output coupler and the high power amplifier, that is, locating the adaptive optics in the laser cavity, has the unique property that it does not require a master oscillator and the power incident on the adaptive optics is only a small fraction of the laser output power.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A self-seeding high power laser comprising:
    a spatial filter;
    an optical relay for circulating a low power un-distorted optical beam from the spatial filter,
    an adaptive optic optically coupled to an output of the optical relay for adaptively modifying a phasefront of the low power un-distorted optical beam;
    a high power amplifier optically coupled to an output of the adaptive optic phase control element for generating a high power un-distorted optical beam, wherein the adaptively modified phasefront injected by the adaptive optic cancels distortions produced by the high power amplifier to generate said high power un-distorted optical beam;
    a beamsplitter optically coupled to the high power amplifier for splitting the high power un-distorted optical beam into a high power output beam as the output of the self-seeding high power laser, and the low power beam;
    a focusing lens for focusing the low power beam into the spatial filter;
    a detector for detecting a metric of the low power beam filtered by the spatial filter; and
    a controller for inputting the detected metric and, based on the detected metric, adaptively controlling the adaptive optic to maximize the power of the high power amplifier.

2. The self-seeding high power laser of claim 1, wherein the detector is a power detector and the metric is a power of the low power beam.

3. The self-seeding high power laser of claim 1, wherein the spatial filter is a single mode fiber, a pinhole or a slit.

4. The self-seeding high power laser of claim 1, wherein the optical relay includes an active single mode fiber with a gain of more than 10 to amplify the low power beam.

5. The self-seeding high power laser of claim 1, further comprising a beam shaping or formatting optics for coupling the low power un-distorted optical beam into the adaptive optic.

6. The self-seeding high power laser of claim 5, wherein the beam shaping or formatting optics is one or more lenses.

7. The self-seeding high power laser of claim 5, wherein the beam shaping or formatting optics is an afocal telescope.

8. The self-seeding high power laser of claim 1, further comprising an isolator optically coupled between the adaptive optic and the optical relay for preventing any reverse propagation or reflection of the high power beam back into the spatial filter.

9. A self-seeding high power laser comprising:
a spatial filter;
an optical relay for circulating a low power un-distorted optical beam;
a high power amplifier optically coupled to an output of the optical relay for generating a high power optical beam with distortions;
an adaptive optic phase control element optically coupled to the output of the high power amplifier for adaptively modifying a phasefront of the high power optical beam with distortions to generate a high power un-distorted optical beam, wherein the adaptively modified phasefront injected by the adaptive optic cancels distortions produced by the high power amplifier to generate said high power un-distorted optical beam;
a beamsplitter optically coupled to the adaptive optic phase control element for splitting the high power un-distorted optical beam into a high power output beam as the output of the self-seeding high power laser, and said low power beam to be circulated by the optical relay;
a detector for detecting a metric of the low power beam; and
a controller for inputting the detected metric and, based on the detected metric, adaptively controlling the adaptive optic phase control element to minimize the phase wavefront distortion of the high power output beam.

10. The self-seeding high power laser of claim 9, wherein the detector is a power detector and the metric is a power of the low power beam.

11. The self-seeding high power laser of claim 9, wherein the optical relay includes an active single mode fiber with a gain of more than 10 to amplify the low power beam.

12. The self-seeding high power laser of claim 9, further comprising a beam shaping or formatting optics for coupling the low power optical beam into the high power amplifier.

13. The self-seeding high power laser of claim 12, wherein the beam shaping or formatting optics is one or more lenses.

14. The self-seeding high power laser of claim 12, wherein the beam shaping or formatting optics is an afocal telescope.

15. The self-seeding high power laser of claim 9, further comprising an isolator optically coupled between the high power amplifier and the optical relay for preventing any reverse propagation or reflection of the high power beam back into the spatial filter.

* * * * *